United States Patent [19]

Akkapeddi et al.

[11] Patent Number: 5,621,040
[45] Date of Patent: Apr. 15, 1997

[54] HIGH IMPACT POLYESTER COMPOSITIONS

[75] Inventors: Murali K. Akkapeddi, Morristown; Bruce VanBuskirk, Dover, both of N.J.

[73] Assignee: AlliedSignal Inc., Morris Township, Morris Co., N.J.

[21] Appl. No.: 514,365

[22] Filed: Aug. 11, 1995

Related U.S. Application Data

[63] Continuation of Ser. No. 317,106, Oct. 3, 1994, abandoned, which is a continuation of Ser. No. 43,056, Apr. 5, 1993, abandoned.

[51] Int. Cl.$^6$ .................................................. C08L 67/02
[52] U.S. Cl. ................. 525/64; 525/68; 525/69; 525/92 F; 525/175
[58] Field of Search ................ 525/64, 69, 92 F, 525/175, 68

[56] References Cited

U.S. PATENT DOCUMENTS

| | | | |
|---|---|---|---|
| 2,284,896 | 6/1942 | Hanford | 525/61 |
| 3,193,522 | 7/1965 | Neumann | 524/195 |
| 4,071,503 | 1/1978 | Thomas . | |
| 4,096,202 | 6/1978 | Faraham . | |
| 4,172,859 | 10/1979 | Epstein . | |
| 4,417,031 | 11/1983 | Aharoni | 525/425 |
| 5,037,897 | 8/1991 | Glans | 525/397 |
| 5,118,805 | 6/1992 | Glans | 525/397 |

FOREIGN PATENT DOCUMENTS

| | | |
|---|---|---|
| 072917 | 3/1983 | European Pat. Off. . |
| 0157635 | 10/1985 | European Pat. Off. . |
| 0197789 | 10/1985 | European Pat. Off. . |
| 0280977 | 9/1988 | European Pat. Off. . |
| 0292251 | 11/1988 | European Pat. Off. . |
| 1208585 | 10/1970 | United Kingdom . |
| WO89/11507 | 11/1989 | WIPO . |

*Primary Examiner*—Patricia A. Short
*Attorney, Agent, or Firm*—Michele Mangini; Roger H. Criss

[57] ABSTRACT

This invention relates to a blend of a polyester, an amine functionalized elastomer and a graft coupling agent.

27 Claims, 4 Drawing Sheets

HIGH IMPACT POLYESTER COMPOSITIONS

This application is a continuation of application Ser. No. 08/317,106 filed Oct. 3, 1994, now abandoned, which is a continuation of application Ser. No. 08/043,056 filed Apr. 5, 1993, now abandoned.

BACKGROUND OF THE INVENTION

1. Field of the Invention

This invention relates to blend compositions formed from a polyester, an amine functionalized elastomer and a graft-coupling agent. Another aspect of this invention relates to articles of manufacture formed totally or in part from the blends of this invention.

2. Prior Art

Blends of polyester and polycarbonates, and the use of same to fabricate articles such as molded parts are known. See for example, U.S. Pat. Nos. 4,522,797; 4,764,556; 4,897,448; 4,737,545; 4,629,760; and 4,753,980 and EPO 0 180 648.

The addition of carbodiimides or polycarbodiimides to various polymers such as polyesters, polyetheresters, acrylate-butylene-diacrylate-diallyl maleate-methacrylate copolymers is known. See for example, U.S. Pat. Nos. 3.975,329; 4,071,503; 4,110,302; 4,689,372 and 4,465,839; and Chem. Abs. 85, 1785339 (1976); 78 17364C (1973); and, 104, 150170K.

SUMMARY OF THE INVENTION

This invention relates to a polymer blend comprising:
  i. a thermoplastic polyester;
  ii. an amine functionalized elastomer; and
  iii. a graft coupling agent for grafting said elastomer to said polyester.

Another embodiment of this invention relates to a polymer blend comprising:
  i. a thermoplastic polyester;
  ii. an aminated functionalized elastomer;
  iii. a graft copolymer of said polyester and said elastomer; and
  iv. residue of a graft-coupling agent from the grafting of said polyester to said elastomer.

The blends of this invention exhibit several advantages. For example, the blends of this invention exhibit relatively high impact strengths both at room temperature (i.e. about 24° C.) and low temperatures (i.e. about −44° C.), and retain a substantial portion of both room and low temperature impact strengths after annealing or heat treatment. The blends of this invention also exhibit relatively low melt viscosities for good melt flow during melt processing. When these property advantages are combined with other properties of polyester such as chemical resistance and heat resistance, the blends of this invention provide significant value in molding applications.

Yet another aspect of this invention relates to the article of this invention comprising a body all or a portion of which is formed from the blend of this invention.

Still another aspect of this invention relates to the process of this invention which comprises:

melt blending a thermoplastic polyester and an anime functionalized elastomer in the presence of an effective amount of an effective graft coupling agent for grafting said elastomer to said polyester to form a polymer blend comprising:
  i. a thermoplastic polyester;
  ii. an aminated functionalized elastomer;
  iii. a graft copolymer of said polyester and said elastomer; and
  iv. residue of a graft-coupling agent from the grafting of said polyester to said elastomer.

DESCRIPTION OF THE PREFERRED EMBODIMENTS

The composition of this invention includes three primary ingredients. As a first primary component, the blend of this invention comprises a thermoplastic polyester. The particular thermoplastic polyester chosen for use can be a homopolyester or a co-polymer, or mixtures thereof as desired. Thermoplastic polyesters are normally prepared by the condensation of an organic dicarboxylic acid and an organic diol, and, therefore illustrative examples of useful polyesters will be described herein below in terms of these diol and dicarboxylic acid precursors.

Polyesters which are suitable for use in this invention are those which are derived from the condensation of an aliphatic, cycloaliphatic or aromatic diol with an aliphatic, aromatic and cycloaliphatic dicarboxylic acid Illustrative of useful cycloaliphatic diols are those having from about 5 to about 8 carbon atoms such as 1,4-dihydroxy cyclohexane, 1,4-dihydroxymethylcyclohexane, 1,3-dihydroxycyclopentane, 1,5-dihydroxycycloheptane, 1,5-dihydroxycyclooctane, 1,4-cyclohexane dimethanol, and the like. Illustrative of suitable aliphatic diols are those having from about 2 to about 12 carbon atoms such as ethylene glycol, 1,5-pentane diol, 1,6-hexane diol, 1,4-butane diol, 1,12-dodecane diol and geometrical isomers thereof, and preferably those having from about 2 to about 6 carbon atoms.

Suitable dicarboxylic acids for use as monomers for the preparation of useful thermoplastic polyesters are linear and branched chain saturated aliphatic dicarboxylic acids, aromatic dicarboxylic acids and cycloaliphatic dicarboxylic acids. Illustrative of aliphatic dicarboxylic acids which can be used in this invention are those having from about 2 to about 50 carbon atoms, as for example, oxalic acid, malonic acids, dimethylmalonic acid, succinic acid, octadecylsuccinic acid, pimelic acid, adipic acid, trimethyladipic acid, sebacic acid, suberic acid, azelaic acid and dimeric acids (dimerization products of unsaturated aliphatic carboxylic acids such as oleic acid) and alkylated malonic and succinic acids, such as octadecylsuccinic acid, and the like. Illustrative of suitable cycloaliphatic dicarboxylic acids are those having from about 6 to about 15 carbon atoms. Such useful cycloaliphatic dicarboxylic acids include 1,3-cyclobutanedicarboxylic acid, 1,2-cyclopentanedicarboxylic acid, 1,3- and 1,4-cyclohexanedicarboxylic acid, 1,3-and 1,4-dicarboxymethylcyclohexane and 4,4'-dicyclohexdicarboxylic acid, and the like. Illustrative of useful aromatic carboxylic acids are terephthalic acid, isophthalic acid, o-phthalic acid, 1,3-, 1,4-, 2,6- or 2,7-naphthalenedicarboxylic acid, 4,4'-diphenyldicarboxylic acid, 4,4'-diphenylsulphone-dicarboxylic acid, 1,1,3-trimethyl-5-carboxy-3-(p-carboxyphenyl)-idane, diphenyl ether 4,4'-dicarboxylic acid bis-p(carboxyphenyl)methane and the like.

Polyester compounds prepared from the condensation of an aliphatic or cycloaliphatic diol, such as ethylene glycol, 1,4-butane diol, and 1,4-dihydroxy cyclohexane and an aromatic dicarboxylic acid such as benzene dicarboxylic acids and naphthalene dicarboxylic acids are preferred for use in this invention. In the most preferred embodiments of this invention poly(ethylene terephthalate), poly(butylene terephthalate), and poly(1,4-cyclohexane dimethylene terephthalate), are the polyesters of choice. Among these polyesters of choice, poly(ethylene terephthalate) and poly(butylene terephthalate) are most preferred. For the composition of this invention, recycled poly(ethylene terephthalate)is useful and preferred.

The number average and the weight average molecular weight of the polyester may vary widely. Usually, the polyester is of a number average or weight average molecular weight that is sufficiently high to form a molded part and sufficiently low to allow melt processing of the polyester/elastomer blend into a molded product. Such number average or weight average molecular weights are well-known to those of skill in the molding art and are usually at least about 5,000 as determined by gel permeatiom chromotography, osmometry, light scattering methods and end-group analysis. The number average or weight average molecular weight is preferably from about 10,000 to about 100,000, more preferably from about 15,000 to about 75,0000 and most preferably from 20,000 to about 50,0000.

The intrinsic viscosity of the polyester is not critical and may vary widely depending on processing requirements. The polyester should preferably have an intrinsic viscosity of at least about 0.3 dl/g; more preferably from about 0.4 to about 1.2 dl/g; and most preferably from about 0.5 to about 0.95 dl/g. These viscosity values are determined with the use of a standard Ubbehlohde viscometer in a phenoltetrachloroethane (60/40 v/v) solution in a concentration of 0.5% at room temperature (about 25° C.).

The polyesters should preferably have active chain end groups viz., carboxylic acid end groups or an electrophilic derivative thereof. While we do not wish to be bound by any theory, it is believed that the carboxylic acid end groups are reactive with the amine groups of the elastomer. Thus, when contacted with an appropriate graft coupling agent under appropriate reaction conditions, such amine and carboxylic acid groups form amide linking groups which link the polyester and elastomer. The concentration of such groups may vary widely, but is preferably at least about 0.01 meq/g, more preferably at least about 0.02 meq/g and most preferably from about 0.03 to about 0.05 meq/g. The concentration of end groups can be determined by standard titrametric methods for carboxyl or hydroxyl determination.

The amount of polyester included in the composition may vary widely, and amounts used in conventional polyester/elastomer blends can be used. In the preferred embodiments of the invention, the amount of polyester employed is equal to or greater than about 10 weight percent based on the total weight of elastomer and polyester in the blend, and in the particularly preferred embodiments of this invention is from about 20 to about 80 weight percent on the aforementioned basis. Amongst these particularly preferred embodiments, most preferred are those embodiments where the amount of polyester employed is from about 40 to about 60 weight percent based on the total weight of polyester and elastomer.

As a second primary ingredient, the composition of this invention includes an amine functionalized elastomer. As used herein, an "amine functionalized elastomer" is a polymer having a polymeric backbone derived from polymerization of one or more $\alpha,\beta$-unsaturated monomers, diene monomers or a combination thereof, having pendant amine functions, terminal amine functions or a combination thereof. Useful elastomers may be homopolymers, or block or random copolymers. Blends of two or more elastomers may also be used in the practice of this invention.

Illustrative of useful dienes are butadiene, 1,4-hexadiene, 1,6-octadiene, 5-methyl-1,4-hexadiene, 3,7-dimethyl-1,6-octadiene, 1,4-cyclohexadiene, 5-ethylidene-2-norbornene, 5-propenyl-2-norbonene, 5-isopropylidene norbornene, 5-methylene norbonene, and the like. Illustrative of useful olefins are aliphatic and aromatic olefins such as ethylene, propylene, isobutylene, styrene, trichlorofluoroethylene, tetrafluoroethylene, acrylic acid, methacrylic acid, vinyl toluene, alkyl acrylates such as methyl methacrylate and methyl acrylate and the like.

The elastomers for use in this invention have an ASTM D-638 tensile modulus equal to or less than about 40,000, preferably equal to or less than about 20,000, more preferably equal to or less than about 10,000, and most preferably equal to or less than about 5,000 . The elastomers have a Mooney viscosity of from about 10 to about 100 ML 1+8@127° C. units, preferably of from about 15 to about 80 units and more preferably of from about 25 to about 70 units.

Useful amine functionalized elastomers can be prepared by known techniques or obtained from commercial sources. For example, useful amine functionalized elastomers can be prepared by the methods described in U.S. Pat. No. 4,987, 200. A useful amine functionalized NBR is commercially availiable from Copolymer Rubber Chemical Corporation under the tradename Nysin DN 508-14A.

Preferred elastomers are those in which the polymeric backbone is formed predominantly from alkyl acrylates, butadiene, ethylene, styrene, isobutylene, propylene and acrylonitrile, and may be homopolymers, copolymers, terpolymers and the like. More preferred amine functionalized elastomers are amine functionalized polybutadiene, polyisoprene, acrylonitrile/butadiene copolymers, isobutylene/butadiene copolymers, ethylene/propylene copolymers, ethylene/propylene/diene terpolymers, ethylene/alkylacrylate copolymers and styrene/butadiene copolymers; and most preferred are amine functiomalized butadiene/acrylonitrile copolymers, ethylene/propylene copolymers, ethylene/alkyl acrylate copolymers, and styrene/butadiene copolymers. The elastomer of choice is an amine functionalized copolymer having two or more divalent alkylene recurring monomeric units. Useful examples are amine functionalized ethylene/propylene copolymers and terpolymers, amine functionalized butadiene/acrylonitrile copolymers (NBR) and their hydrogenated derivatives.

The polymeric backbone is modified by copolymerization or by post reaction to form pendant amine functionalities randomly distributed along the polymeric backbone, terminal amine functionalities at one or both ends of the polymeric backbone or a combination thereof. Illustrative of such amino groups are amine ($-NH_2$) and alkyl amino groups, having an active hydrogen such as e.g. methylamine ($-NHCH_3$), ethylamine ($-NHC_2H_5$), propylamine (—NHC$_3$H$_7$), butylamine (—NHC$_4$H$_9$) and isonomers thereof. The amino group of choice is amine (—NH$_2$).

Useful grafting and copolymerization techniques used in the preparation of the such functionalized elastomers are disclosed in U.S. Pat. No. 4,987,200. In the preferred embodiments of the invention, amine functionalities are randomly distributed along the polymeric backbone and are formed by copolymerization of the monomer precursors of the recurring monomeric units in the polymeric backbone with an ethylenically unsaturated monomer containing the desired amine functionality such as p-aminostyrene, 2-aminopropylacrylamide, norbornene unsaturation type monomers including norbornene and its higher homologs e.g. norbornenyl-methyl amines.

The mole percent of pendant and terminal amine functionalities may vary widely. The only requirement is that the amount is sufficient to allow some grafting of the elastomer and the polyester.

The amount of elastomer included in the composition may vary widely and any amount typically used in polyester/elastomer blends can be used. Usually, the amount of elastomer is at least about 1% by weight of the polyester and elastomer in the composition. The amount of elastomer is preferably from about 5 to about 30% by weight, more preferably from about 5 to about 20% by weight and most preferably from about 10 to about 20 % by weight based on the total weight of polyester and elastomer in the composition.

As a third primary ingredient, the composition includes an effective amount of an suitable "graft-coupling agent". As used herein a "graft-coupling agent" is a reagent which is believed to promote the coupling reaction between the amine functionalized elastomer and the polyester and/or chain extension crosslinking of the polyester and the amine functionalized elastomer, respectively. Any graft-coupling agent which provides this function can be used in the practice of this invention. Illustrative of such graft coupling agents are phosphites such as triscaprolactam phosphorous; and phosphites having alkyl, aryl, alkylaryl and aralkyl substituents such as trinonylphenyl phosphite, triphenyl phosphite and the like. Such graft coupling agents are described in greater detail in U.S. Pat. Nos. 5,037,897 and 5,124,411.

Other useful graft coupling agents are polycarbodiimides. Illustrative of useful polycarbodiimides are those comprising repeat units of the formula:

wherein —R$_2$— is a divalent hydrocarbon radical such as an aliphatic radical having from 1 to about 20 carbon atoms as for example methylene, butylene, isobutylene, nonylene, dodecylene, neopentylene and the like; a cycloaliphatic radical having from 5 to about 12 carbon atoms such as cyclo-octylene, 1,4-dimethylene cyclohexylene, cyclohexylene and the like; an aromatic radical having from 6 to about 16 carbon atoms such as phenylene, naphthalene, 1,4-dimethylene phenylene, bisphenylene, diphenylmethane, 2,2-diphenylene propane and the like; or a aliphatic, aromatic or cycloaliphatic radical containing one or more divalent radicals of the formula: —O—, —SO$_2$—, —C(O)—, —C(O)O—, —NH—, —S— and the like, such as diphenylene sulfone, diphenylene ether, diphenylene ketone, diphenylene amine, diphenylene sulfide, and the like.

Particularly useful polycarbodiimides include poly (2,4,6-triisopropyl-1,3-phenylene carbodiimide); poly(2,6 diisopropyl-1,3-phenylene carbodiimide), poly(tolyl carbodiimide); poly(4,4'-diphenylmethane carbodiimide); poly(3,3'-dimethyl-4,4'-biphenylene carbodiimide); poly(phenylene carbodiimide); poly(m-phenylene carbodiimide); poly(3,3'-dimethyl-4,4'-diphenylmethane carbodiimide); poly(naphthylene carbodiimide); poly(isophorone carbodiimide); poly(cumene carbodiimide); poly(mesitylene carbodiimide); and mixtures thereof. Preferred polycarbodiimide are poly(2,6-diisopropyl-1,3-phenylene carbodiimide (Stabaxol®P), poly (2,4,6-triisopropyl-1,3-phenylene carbodiimide)(Stabaxol®P-100) and poly(2,2', 6,6', tetraisopropyldiphenylene carbodiimide) (Stabaxol®D) . These preferred materials are commercially available as Stabaxol®grades from Rhein-Chemie.

Useful polycarbodiimides may be formed by processes known to those of skill in the art or may be obtained from commercial sources. For example, useful polycarbodiimides can be prepared by heating the corresponding isocyanates in the presence or absence of a solvent and a catalyst such as phosphorus containing catalysts. These procedures are described in greater detail in U.S. Pat. No. 2,853,473 and Monogle, J. J. "Carbodiimides., Ill. Conversion of Isocyantes to Carbodiimides. Catalyst Studies", *J. Org. Chem.* 27, 3851 (1962).

Another class of graft-coupling agents are blocked isocyanates and diisocyanates. Examples are caprolactam blocked methylene bis(4,4'-diisocyanatobenzene) (blocked MDI), blocked toluene 2,4-diisocyanate and the like. Useful blocked isocyanates and blocked diisocyanates can be prepared by known techniques or obtained from commercial sources as for example from Miles under the tradename Desmodur isocyanates.

Yet another class of useful graft coupling agents are di- or multifunctional epoxides such as diglycidyl ether of bisphenol-A, triglycidyl ether of p-aminophenol, and epoxynovolacs (EPN-1138, ECN-1299). Certain of these materials can be prepared by conventional techniques known to those of skill in the art, or obtained from commercial sources as for example from Ciba Geigy. Still another class of useful graft-coupling agents include multifunctional oxazolines (e.g. m-phenylene bisoxazolines) commercially available from Takeda, Japan.

The composition includes an "effective amount of graft-coupling agent". As used herein, an "effective amount of graft coupling agent" is an amount which when melt blended with a composition of the thermoplastic polyester and amine functionalized elastomer is sufficient to enhance the extent to which the composition retains its impact strength (low and/or high temperature) after annealing. Usually, the amount of graft coupling agent is at least about 0.1% by weight of the polyester and elastomer in the composition. The amount of graft coupling agent is preferably from about 0.3 to about 5 % by weight, more preferably from about 0.5 to about 2% by weight and most preferably from about 1 to about 2% by weight on the aforementioned basis.

In addition to the above-described essential components, the blend of this invention can include various optional components which are additives commonly employed with polyester resins. Such optional components include fillers such as talc, fiberglass, clay and the like; plasticizers, such as lactams, polyesters and sulfonamides such as caprolactam, lauryllactam, ortho and para-toluene ethyl sulfonamides polyester glutamate, polyester glycol, polyester adipate and the like, impact modifiers, chain extenders; colorants and pigments such as iron oxide, calcium red, rhodamine, chrome yellow, chrome green, phthalo-cyanine blue and the like; mold release agents; antioxidants; ultra violet light stabilizers; nucleators; lubricants; antistatic agents; fire retardants; and the like. These optional components are well known to those of skill in the art, accordingly, will be described herein in detail. These optional materials may be incorporated into the composition using any conventional process. Typically, such optional materials are included in the mixing seeped for formation of the blend or is added in subsequent melt forming processes such as injection molding.

The composition of this invention exhibits relatively high impact strength both at room temperature (i.e. about 24° C.) and at low temperature (down to about –40° C.) as measured by ASTMD-256 notched Izod at 23° C., 0.1875 inch (0.476 cm) thick samples and ASTM D-638 tensile strength modulus and elongation. The blend preferably retains all or substantially all the room and low temperature strength after heating at a temperature of 150° C. for 16 hours. In the preferred embodiment of this invention the composition maintains a "useful level of room and low temperature impact strength" after annealing for 16 hrs. at 150° C. As used herein, a "useful level of room and low temperature impact strength" is equal to or greater than 50 ft. lbs of drop weight impact strength and an initial Notched Izod before annealing of equal to or greater than 5 ft lbs/sec, preferably equal to or greater than about 8 ft lbs/sec and more preferably equal to or greater than about 10 ft lb/sec. Amongst these preferred embodiments of the invention, preferred are the compositions which retain at least about 50% of their room temperature (23° C.) impact strength (notched izod) and at least about 20% of their low temperature (–40° C.) impact strength (notched izod) after annealing; more preferred are the compositions which retain at least about 80% of their room temperature impact strength and at least about 30% of their low temperature impact strength after annealing; and most preferred are the compositions which retain at least about 90% of their room temperature impact strength and at least about 40% of their low temperatureimpact strength after annealing.

The composition of this invention can be prepared by blending or mixing the essential ingredients, and other optional components, as uniformly as possible employing any conventional blending means. Appropriate blending means, such as melt extrusion, batch melting and the like, are well known in the art and will not be described here in greater detail. See for example, "Extrusion" in the Encyclopedia of Polymer Science of Technology, Vo. 6, p. 571–631; John Wiley & Sons, 1986, incorporated herein by reference. Usefully, the blending procedure can be carried out at elevated temperatures above the melting point of the polymers added either alone or as a combination in a suitable form as for example, granules, pellets and powders are added to the melt with vigorous stirring. For example, the polyester can be masterbatched or preblended with the elastomer and the graft-coupling agent in the melt and this premixed or masterbatch added to the elastomer or polester in the melt in amounts sufficient to provide the desired amount of polyester, graft-coupling agent and elastomer in the blend product. Similarly the blending procedure can be carried out at elevated temperatures, where one of the polymer components is melted and the other polymer component and the graft-coupling agent are admixed therewith by vigorously stirring the melt. Similarly, the various solid components can be granulated, and the granulated components mixed dry in a suitable blender, as for example, a Banbury mixer, as uniformly as possible, then melted in an extruder and extruded with cooling.

Alternatively, the composition of this invention can be formulated by dissolving the components in an appropriate inert solvent, after which the solvent is removed by evaporation, or other conventional solvent removing means are employed to provide the composition. The solvent is not critical, the only requirement being that it is inert to the components of the composition, and it is capable of solubilizing the various components, or at least forming dispersion thereof.

The blend according to the invention can be used for those applications for which polyesters and blends thereof can be used. They are thermoplastic materials from which molded articles of manufacture having valuable properties can be produced by conventional polymer shaping processes, such as injection molding and extruding. Examples of such moldings are components for technical equipment, lawn and garden equipment, power snow shovel and snow-mobile equipment, household equipment, sports equipment, powertool equipment for the electrical and electronics industries and electrical insulations, automobile components, and semi-finished products which can be shaped by machining. The composition of this invention is especially suited for use in the fabrication of automotive parts, especially, those for use under the hood which may be exposed to high temperatures during the operation of the automobile. Similarly, the blend of this invention can be used to fabricate components of powertools, snowmobiles and similar equipment operated outdoors.

The following examples are presented to better illustrate the invention and should not be construed as limiting the invention.

COMPARATIVE EXAMPLE 1

Blend of Poly(ethylene terephthalate) (PET) and Ethylene/Propylene Rubber (ERR)

A pellet/pellet mixture of 12 lbs of PET (IV=0.7 dl/g in phenol/TCE, 0.035 meq/g COOH) and 4 lbs of EPR (Exxon PE 901, unmodified, Mooney Visc.=25) was fed into the throat of a 34 mm Leistritz corotating fully intermeshing twin screw extruder. The extruder contained 10 heated barrel sections with downstream feed capability at the 4th and 6th barrel sections. A typical temperature profile has the first three barrel sections heated to 250° C. and the rest heated to 270° C. Mixing elements are located in sections 5 and 7. Materials are typically starve fed at 30–35 Ib/hr, at a screw speed of 200–250 RPM. The resulting extrudate was water cooled, pelletized and vacuum dried for use in injection molding experiments.

COMPARATIVE EXAMPLE 2

Blend of Poly(ethylene terephthalate) (PET) and Maleated Ethylene/Propylene Rubber (MA-EPR)

Using the procedure of apparatus of Comparative Example 1, pellet/pellet mixture of 12 lbs of PET (IV=0.7 dl/g in phenol/TCE, 0.035 meq/g COOH) and 4 lbs of MA-EPR (Exxon Excelor 1803, 0.7% maleation, Mooney Visc.=25) was fed into the throat of the Leistritz extruder. The extrudate was water cooled, pelletized and vacuum dried for use in injection molding experiments.

COMPARATIVE EXAMPLE 3

Blend of Poly(ethylene terephthalate) (PET) and Amine Functionalized Ethylene/Propylene Rubber (A-EPR)

Using the procedure and apparatus of Comparative Example 1,4 lbs of a A-EPR was fed into the throat of the Leistritz extruder. Concurrently, 12 lbs of PET (IV=0.7 dl/g in phenol/TCE, 0.035 meq/g COOH) was added downstream in barrel section 6. Vacuum was applied to barrel section 4 during the extrusion. The resulting extrudate was water cooled, pelletized and vacuum dried for use in injection molding experiments.

EXAMPLES 1 to 5

Blend of Poly(ethylene terephthalate) (PET), Amine Functionalized Ethylene/Propylene Rubber (A-EPR) and Graft Coupling Agent Using the procedure and apparatus of Comparative Example 1, a pellet/pellet mixture of 10.4 lbs of PET (IV=0.7 dl/g in phenol/TCE, 0.035 meq/g COOH) and 4 lbs of a A-EPR was fed into the throat of the Leistritz extruder. Concurrently, a powder/powder mixture of 1.3 lbs of powdered PET (IV=0.7 dl/g in phenol/TCE, 0.035 meq/g COOH) and 0.3 lbs of graft coupling agent was added downstream in barrel section 6. The graft coupling agent used in Example 1 was poly(2,4,6-triisopropyl-1,3-phenylene carbodiimide) obtained from Rhein Chemie under the tradename "SABAXOLP-100"; in Example 2 was 2,6-diisopropyl-1,3-phenylene carbodiimide) obtained from Rhein Chemie under the tradename "STABAXOL P"; in Example 3 was bis[2,4-di-tert-butylphenyl] pentaerythritol diphosphite obtained from G.E. Specialty Chemicals under the tradename "ULTRANOX 626"; in Example 4 was phosphorus tris caprolactam described in U.S. Pat. No. 5,118,805; and in Example 5 was caprotactam blocked poly(methylene bis-(4,4'-diisocyanatobenezene)). The resulting extrudate was water cooled, pelletized and vacuum dried for use in injection molding experiments.

nylene carbodiimide), was added downstream in barrel section 6. The resulting extrudate was water cooled, pelletized and vacuum dried for use in injection molding experiments and injection molded.

COMPARATIVE EXAMPLE 5

A series of experiments was carried out to show the effect of the combination of graft coupling agent and amine functionalized elastomer on the properties of poly(ethylene terephthalate). The properties selected for evaluation were the initial high and low temperature Notched Izod, high and low temperature Notched Izod after annealing at a temperature of 150° C. for 16 hrs., the initial elongation-to-break and the elongation-to-break after annealing. In these experiments pellets of the polymer blend pellets are injection molded into ASTM test specimens on an Arburg 25 ton Allrounder molding machine. The molded specimens are tested for notched izod impact strength (ASTM D256), tensile strength and elongation (ASTM D638), and flexural strength and modulus (ASTM D790). Some specimens are also tested for drop wt impact strength (ASTM D3029).

Figure 1:
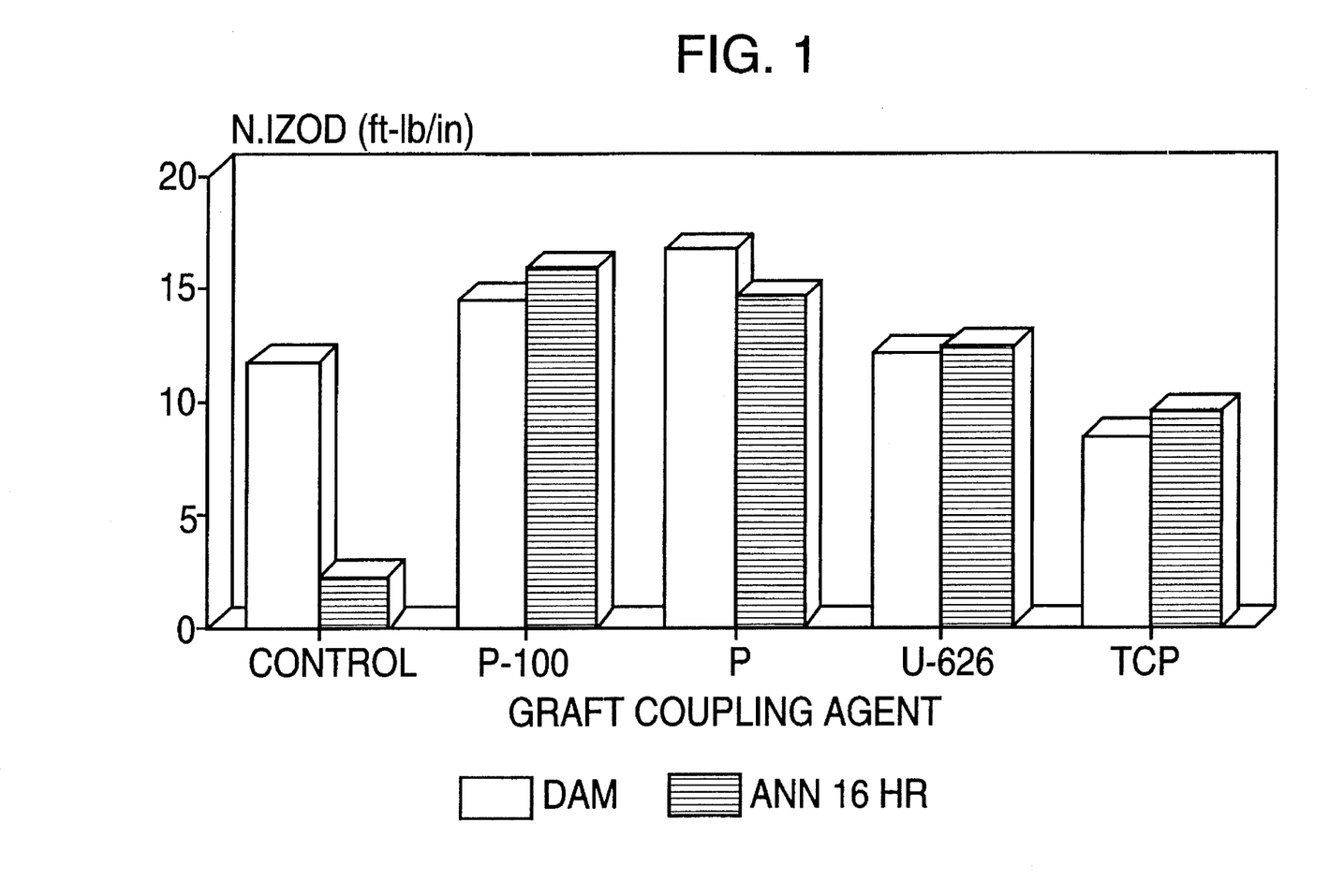
FIGS. 1 and 2 are bar graphs of Notched Izod vs. elastomer type showing the improved properties of the compositions of this invention containing poly(ethylene terephthalate).
Figure 2:
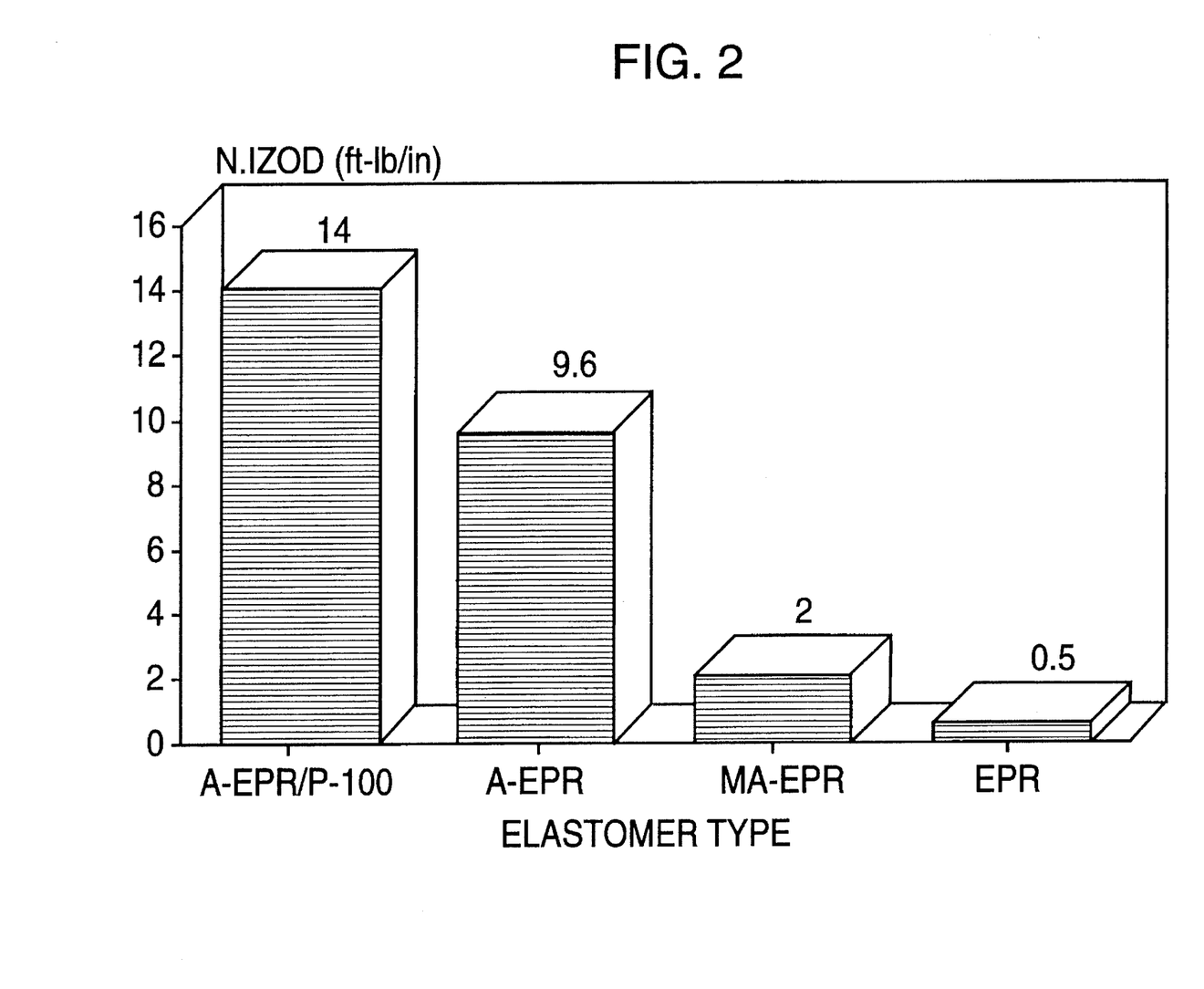

The results of the experiments are set forth in FIGS. 1 and 2 and the following Table 1. In the Table, the abbreviations have the following meanings:

(a) "NI-23" means initial Notched Izod of a sample after molding measured at 25° C.

(b) "NI-40" means initial Notched Izod of a sample after molding measured at –40° C.

(c) "ANI-23" means Notched Izod of a sample after annealing for 16 hrs. at 150° C. measured at 25° C.

(d) "ANI-40" means Notched Izod of a sample after annealing for 16 hrs. at 150° C. measured at –40° C.

(e) "EB" means the initial elongation-to-break of a sample after molding.

(f) "AEB" means the elongation-to-break of a sample after annealing for 16 hrs. at 150° C.

TABLE 1

| EXP. NO. | SAMPLE | NI-23 (ft-lb/in) | NI-40 (ft-lb/in) | ANI-23 (ft-lb/in) | ANI-40 (ft-lb/in) | EB (%) | AEB (%) |
| --- | --- | --- | --- | --- | --- | --- | --- |
| 1 | Ex. 1 | 16.3 | 14 | 16 | 4 | 417 | 25 |
| 2 | Ex. 2 | 16.8 | 7.9 | 14.6 | 3.8 | 360 | 18 |
| 3 | Ex. 3 | 12.2 | 15.4 | 12.4 | 3.4 | 245 | 5 |
| 4 | Ex. 4 | 8.4 | 16.1 | 9.5 | 6.8 | 433 | 6 |
| 5 | Ex. 5 | 10.5 | 2.5 | 5.2 | 2.2 | 138 | 6 |
| 6 | Comp. Ex. 1 | 1.5 | 0.5 | 0.2 | 0.2 | 126 | 0 |
| 7 | Comp. Ex. 2 | 11.5 | 2.0 | 0.7 | 0.4 | 251 | 1 |
| 8 | Comp. Ex. 3 | 12.2 | 9.6 | 1.6 | 0.4 | 435 | 5 |
| 9 | Comp. Ex. 4 | 16.1 | 2.0 | 2.2 | 1.9 | 122 | 5 |

COMPARATIVE EXAMPLE 4

Blend of Poly(ethylene terephthalate) (PET), Maleated Ethylene/Propylene Rubber (EAA-EPR) and Graft Coupling Agent A pellet/pellet mixture of 10.4 lbs of PET (IV=0.7 dl/g in phenol/TCE, 0.035 meq/g COOH) and 4 lbs of MA-EPR (Exxon Excelor 1803, 0.7% maleation, Mooney Visc.=25) was fed into the throat of the Leistritz extruder. Concurrently, a powder/powder mixture of 1.3 lbs of powdered PET (IV=0.7 dl/g in phenol/TCE, 0.035 meq/g COOH) and 0.3 lbs of the graft promoter, poly(2,4,6-triisopropyl-1,3-phe-

COMPARATIVE EXAMPLE 6

Blend of Poly(Butylene Terephthalate) (PBT) and Amine Functionalized Ethylene/Propylene Rubber (A-EPR)

A pellet/pellet mixture of 16 lbs. of PBT (GE Valox 325) and 4 lbs. of A-EPR was fed into the throat of the Leistritz extruder. The resulting blend was cooled, pelletized and vacuum dried for use in injection molding experiments.

EXAMPLE 6

Blend of Poly(Butylene Terephthalate) (PBT), Amine Functionalized Ethylene/Propylene Rubber (A-EPR) and Graft Coupling Agent A pellet/pellet mixture of 1.1 lbs. of PBT (GE Valox 325) and 3.2 lbs. of A-EPR was fed into the throat of the Leistritz extruder. Concurrently, a powder/powder mixture of 1.3 lbs. of powdered PBT (GE Valox 325) and 0.3 lbs. of the graft coupling agent poly(2,4,6-triisopropyl-1,3-phenylene carbodiimide) obtained from Rhein Chemie under the tradename "Stabaxol P-100" was added dowstream in barrel section 6. The resulting blend as cooled, pelletized and vacuum dried for use in injection molding experiments.

COMPARATIVE EXAMPLE 7

A series of experiments was carried out to show the effect of the combination of graft coupling agent and amine functionalized elastomer on the properties of poly(buthylene terephthalate). The properties selected for evaluation were the initial high and low temperature Notched Izod, high and low temperature Notched Izod after annealing at a temperature of 150° C. for 16 hrs., the initial elongation-to-break and the elongation-to-break after annealing. In these experiments pellets of the polymer blend pellets are injection molded into ASTM test specimens on an Arburg 25 ton Allrounder molding machine. The molded specimens are tested for notched izod impact strength (ASTM D256), tensile strength and elongation (ASTM D638), and flexural strength and modulus (ASTM D790). Some specimens are also tested for drop wt impact strength (ASTM D3029).

Figure 3:
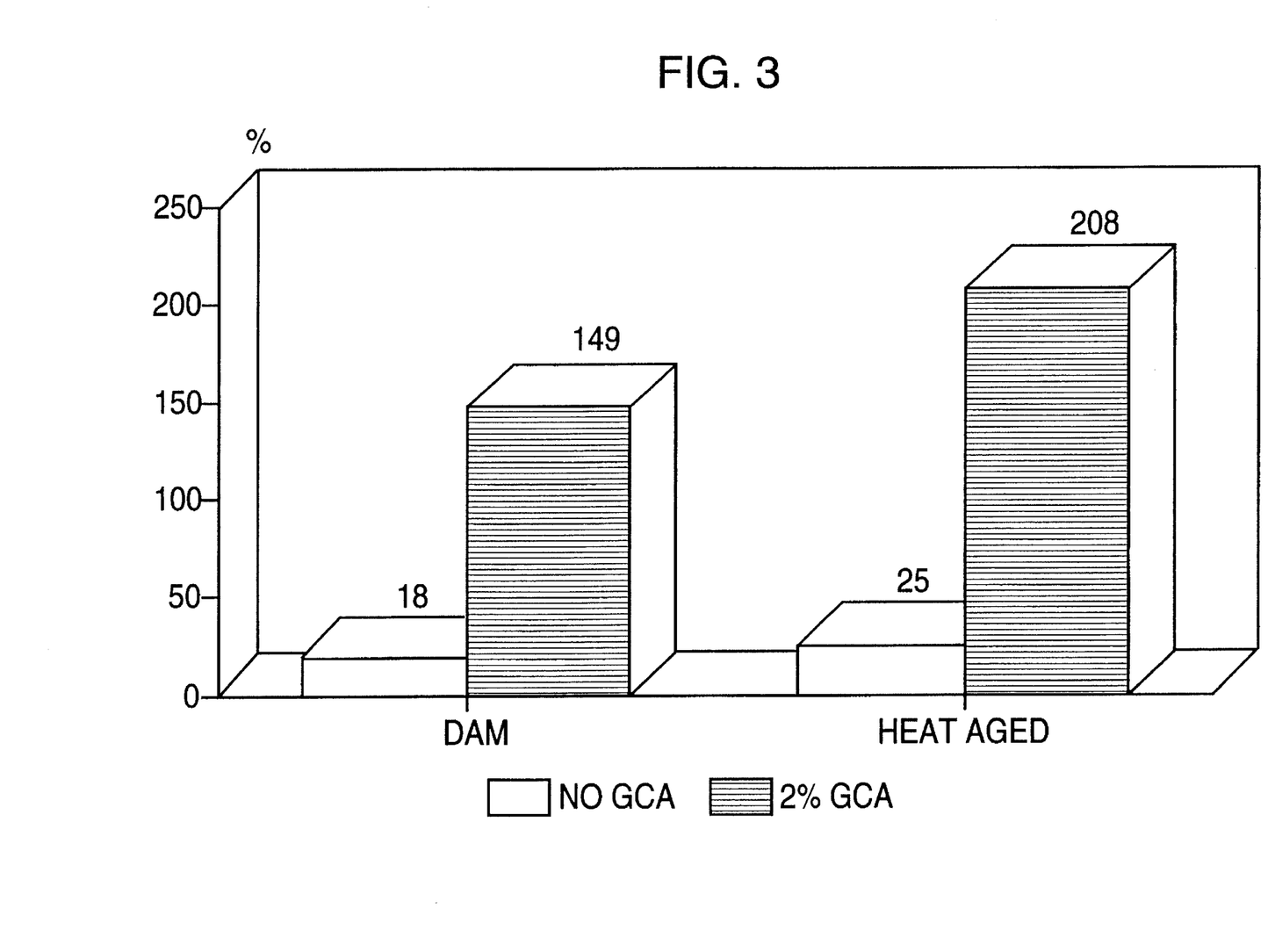
FIGS. 3 and 4 are bar graphs of Notched Izod vs. graft coupling agent showing the improved properties of the compositions of this invention containing poly(butylene terephthalate).
Figure 4:
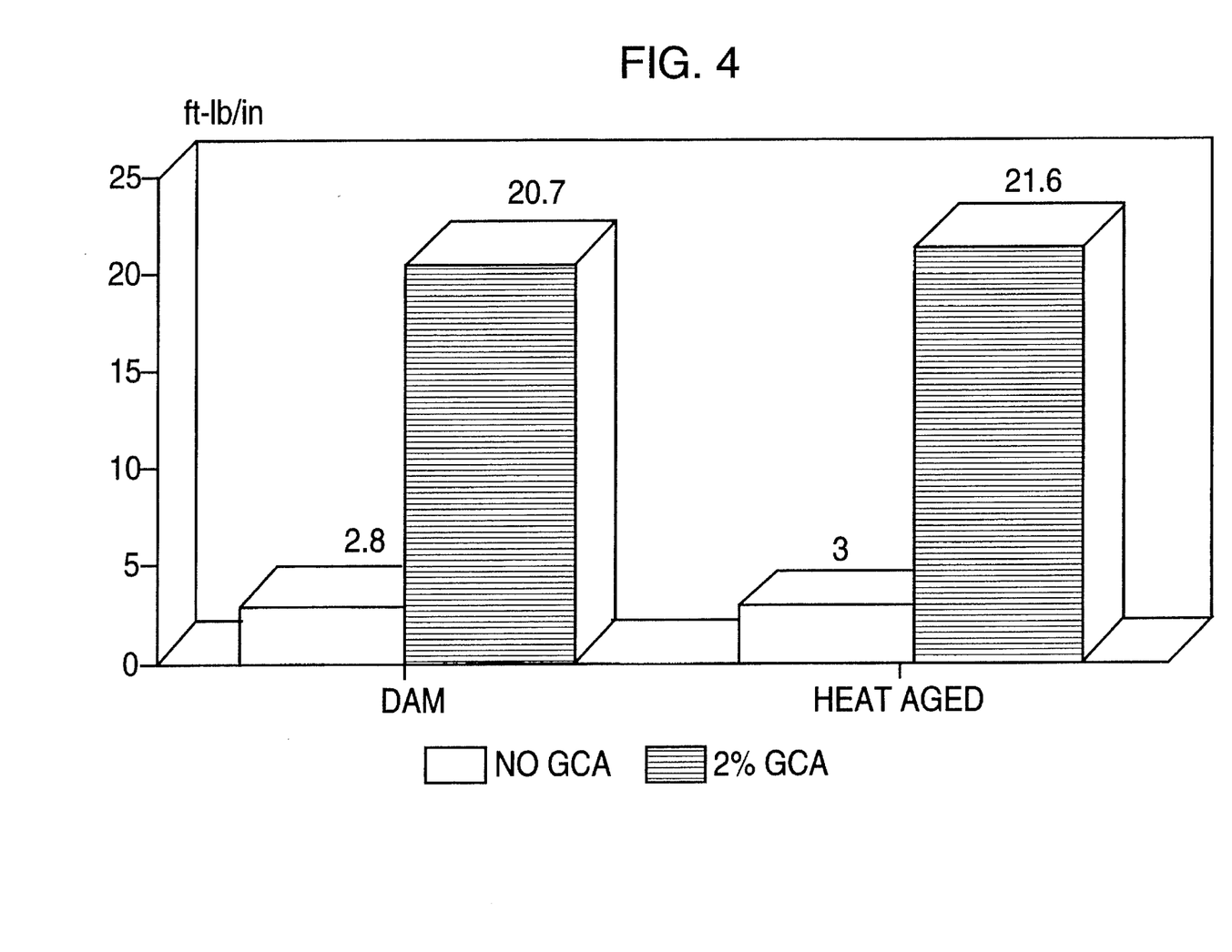

The results of the experiments are set forth in FIGS. 3 and 4 and the following Table 2. In the Table, the abbreviations have the following meanings:

(a) "NI-23" means initial Notched Izod of a sample after molding measured at 25° C.

(b) "ANI-23" means Notched Izod of a sample after annealing for 16 hrs. at 150° C. measured at 25° C.

(c) "EB" means the initial elongation-to-break of a sample after molding.

(d) "AEB" means the elongation-to-break of a sample after annealing for 16 hrs. at 150° C.

TABLE 2

| EXP. NO. | SAMPLE | NI-23 (ft-lb/in) | ANI-23 (ft-lb/in) | EB (%) | AEB (%) |
|---|---|---|---|---|---|
| 1 | Ex. 6 | 20.7 | 21.6 | 149 | 208 |
| 2 | Comp. Ex. 6 | 2.8 | 3 | 18 | 25 |

What is claimed is:

1. A polymer blend comprising:
   i. a thermoplastic polyester;
   ii. a phosphite graft coupling agent; and
   iii. an elastomer comprised of a polymer having a backbone derived from polymerization of at least one monomer comprising alpha-beta-unsaturated monomers, diene monomers, or combinations thereof and having a functionality comprising a pendant amine, a terminal amine, or combinations thereof, or a polymer blend thereof.

2. A polymer blend according to claim 1 wherein said polyester comprises at least one terminal carboxylic acid group which further comprises an effective amount of an effective graft coupling agent for promoting the grafting of said elastomers to said polyester.

3. A blend of claim 2 wherein said thermoplastic polyester comprises recurring monomeric units derived from aliphatic or cycloaliphatic diols and from aromatic dicarboxylic acids or esters thereof.

4. A blend of claim 3 wherein said aliphatic diols have from 2 to about 12 carbon atoms and said cycloaliphatic diols have from 6 to about 15 carbon atoms.

5. A blend of claim 4 wherein said aromatic dicarboxylic acids are selected from the group consisting of dicarboxylic acids of benzene and dicarboxylic acids of naphthalene.

6. A blend of claim 5 wherein said thermoplastic polyester is selected from the group consisting of poly(ethylene terephthalate), poly(butylene terephthalate) and poly(1,4-cyclohexane dimethylene terephthalate).

7. A blend of claim 6 wherein said thermoplastic polyester is selected from the group consisting of poly(ethylene terephthalate) and poly(butylene terephthalate).

8. A blend of claim 7 wherein said thermoplastic polyester is poly(ethylene terephthalate).

9. A blend of claim 2 wherein said polyester is in an amount equal to or greater than about 10% by weight of the total weight of polyester, and elastomer in said blend.

10. A blend of claim 9 wherein said amount is from about 20 to about 80% by weight.

11. A blend of claim 10 wherein said amount is from about 40 to about 60% by weight.

12. A blend according to claim 2 wherein said elastomer comprises recurring monomeric units derived from alkyl acrylates, butadiene, ethylene, styrene, isobutylene, propylene, acrylonitrile or a combination thereof.

13. A blend according to claim 12 wherein said elastomer is selected from the group consisting of amine functionalized polybutadiene, polyisoprene, butadiene/styrene copolymer, acrylonitrile/butadiene copolymer, isobutylene/butadiene copolymer, ethylene/propylene copolymer, ethylene/propylene/diene terpolymer and ethylene/alkylacrylate copolymer.

14. A blend of claim 13 wherein said elastomer is an amine functionalized ethylene/propylene copolymer or butadiene/acrylonitrile copolymer.

15. A blend of claim 2 wherein said amine groups are $-NH_2$, $-NHR_1$ (where $R_1$ is alkyl) or a combination thereof.

16. A blend of claim 2 wherein said elastomer is in an amount of at least about 1% by weight of the total weight of polyester, and elastomer in said blend.

17. A blend of claim 16 wherein said amount is from about 5 to about 30% by weight.

18. A blend of claim 17 wherein said amount is from about 10 to about 20% by weight.

19. A blend of claim 2 wherein said graft coupling agent is a phosphite having alkyl, aryl, alkylaryl or aralkyl substituents.

20. A blend of claim 19 wherein said phosphite is trinonylphenyl phosphite or triphenyl phosphite.

21. A blend of claim 2 wherein said graft coupling agent is in an amount at least about 0.01% by weight of polyester, and elastomer in the blend.

22. A blend of claim 21 wherein said amount is from about 0.3 to abot 5% by weight.

23. A blend of claim 22 wherein said amount is from about 0.5 to about 2% by weight.

24. A blend of claim 1 wherein said phosphite graft coupling agent is triscaprolactam phosphorous.

25. A polymer blend comprising:

i. a thermoplastic polyester;

ii. an elastomer comprised of a polymer having a backbone derived from polymerization of at least one monomer comprising alpha-beta-unsaturated monomers, diene monomers, or combinations thereof and having a functionality comprising a pendant amine, a terminal amine, or combinations thereof, or a polymer blend thereof;

iii. a graft copolymer of said polyester and said elastomer; and iv. a residue of a phosphite coupling agent from the grafting of said polyester to said elastomer to form an elastomer-polyester graft product.

26. A process for forming a polymer blend comprising a thermoplastic polyester, an elastomer comprised of a polymer having a backbone derived from polymerization of at least one monomer comprising alpha-beta-unsaturated monomers, diene monomers, or combinations thereof and having a functionality comprising a pendant amine, a terminal amine, or combinations thereof, or a polymer blend thereof, a graft copolymer of said polyester and said elastomer, and a residue of a phosphite graft coupling agent from the grafting of said polyester to said elastomer, said process comprising melt blending a mixture comprising said polyester, said elastomer and said graft coupling agent to form said blend.

27. A blend formed from the process of claim 26.

* * * * *